March 19, 1968   A. JEUNET   3,374,009
FOLDING BICYCLE

Filed March 14, 1966   2 Sheets-Sheet 1

INVENTOR
ANDRE JEUNET
BY Young & Thompson
ATTYS.

March 19, 1968  A. JEUNET  3,374,009
FOLDING BICYCLE
Filed March 14, 1966  2 Sheets-Sheet 2
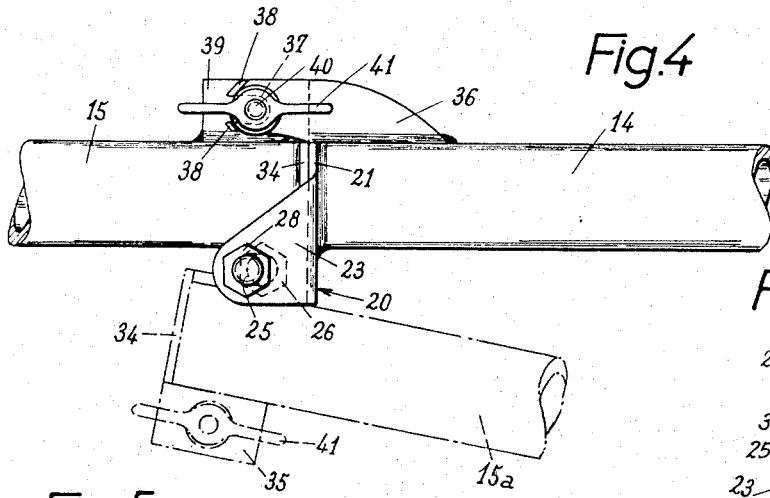
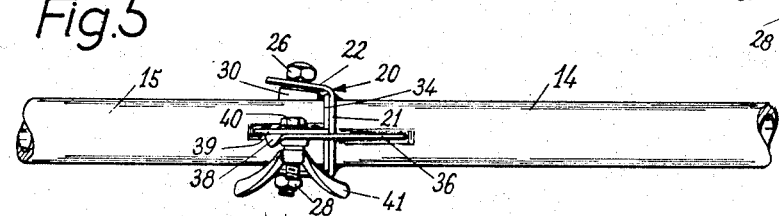
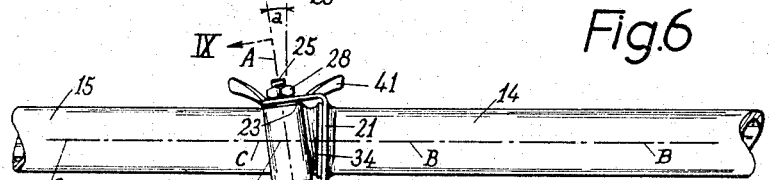
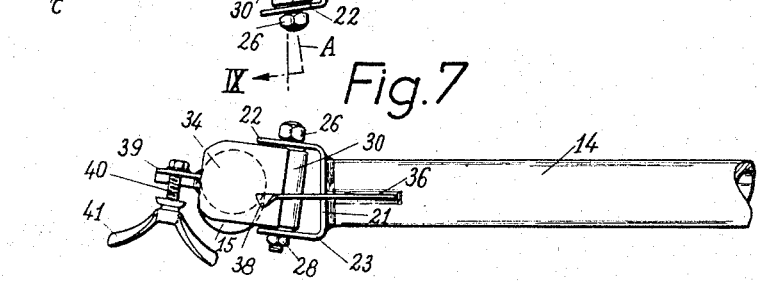
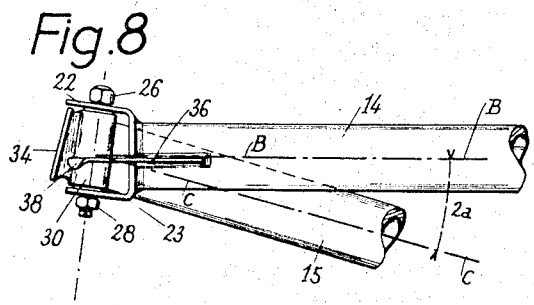
INVENTOR
ANDRE JEUNET
By Young + Thompson
ATTYS.

United States Patent Office 3,374,009
Patented Mar. 19, 1968

3,374,009
FOLDING BICYCLE
André Jeunet, 24 Ave. de Besacon,
Dole, Jura, France
Filed Mar. 14, 1966, Ser. No. 534,073
Claims priority, application France, Mar. 24, 1965,
10,466
4 Claims. (Cl. 280—287)

ABSTRACT OF THE DISCLOSURE

A folding bicycle has a main frame member in the form of a single tubular beam comprised by two aligned tube sections hinged together for relative vertical swinging movement about a horizontal axis disposed below the beam at an oblique angle to the axis of the beam. In this way, weight on the bicycle is transmitted as compression acting lengthwise in the beam. A lock for maintaining the bicycle extended comprises a pair of radial ribs one on each beam section and a wing nut for releasably securing them together. The pivotal connection comprises a yoke on one beam section that receives a sleeve on the other beam section, with a pivot pin extending through the yoke and sleeve.

---

This invention relates to a folding bicycle of improved design which can in particular be folded up in one piece without entailing the use of any tool.

Collapsible bicycles already exist in which certain tubes of the frame, instead of being in one piece, are made up of sections of tubing which are assembled together by fitting one inside the other. By disassembling said tube sections, the frame can be separated into two parts, thus making it possible in particular to juxtapose the front wheel and rear wheel with a view to reducing the overall size of the bicycle.

These arrangements have a disadvantage in that the user is confronted with two separate parts of substantial size which have to be secured to each other by suitable external means before the assembly can be handled.

Furthermore, if disassembly operations are not frequent, they can become difficult and entail considerable physical exertion. It has also been endeavored to make an ordinary bicycle collapsible by placing articulations on the two tubes of the frame which connect the steering tube to the rear part of the bicycle.

In this type of bicycle, the articulations make it possible to fold the bicycle only as a result of lateral rotation about substantially vertical axes.

Systems of this type have a disadvantage in that they lack rigidity when the bicycle is in running order, with the result that the requirements of the user and the stability of the bicycle are not adequately ensured. Moreover, the arrangements referred-to above make it difficult to place the brake and lighting cables in such manner that these latter can remain in position when the bicycle is folded.

The object of this invention is to overcome the drawbacks mentioned above.

In accordance with the invention, the frame of the improved folding bicycle consists of a single tubular beam which joins the crank-gear to the steering tube and is mainly characterized in that said bicycle comprises a hinged articulation interposed in the single tubular beam, the axis of said hinged articulation being directed at an oblique angle with respect to the axis of said tubular beam so that the front wheel and rear wheel are juxtaposed when the bicycle is in the folded position.

In accordance with a preferred form of embodiment of the invention, the oblique axis of the tubular beam is located beneath said beam when the bicycle is in running order, with the result that the weight of the cyclist tends to close the articulation.

Further characteristic features of the invention will become apparent from the description which now follows.

A particular form of embodiment of folding bicycle in accordance with the invention is shown in the accompanying drawings which are given solely by way of example and not in any sense by way of limitation, and in which:

FIG. 4 is a view in elevation on a larger scale showing the articulation in the closed position, the folded position of said articulation being shown in chain-dotted lines;

FIG. 5 is an overhead plan view on a smaller scale and showing the articulation in the closed condition;

FIG. 6 is a plan view of the closed articulation, looking on the underside;

FIG. 7 is an overhead plan view of the articulation in the half-open condition;

FIG. 8 is an overhead plan view of the articulation in the fully open condition;

FIG. 9 is a partial view in cross-section taken along the line IX—IX of FIG. 6.

Figure 1:
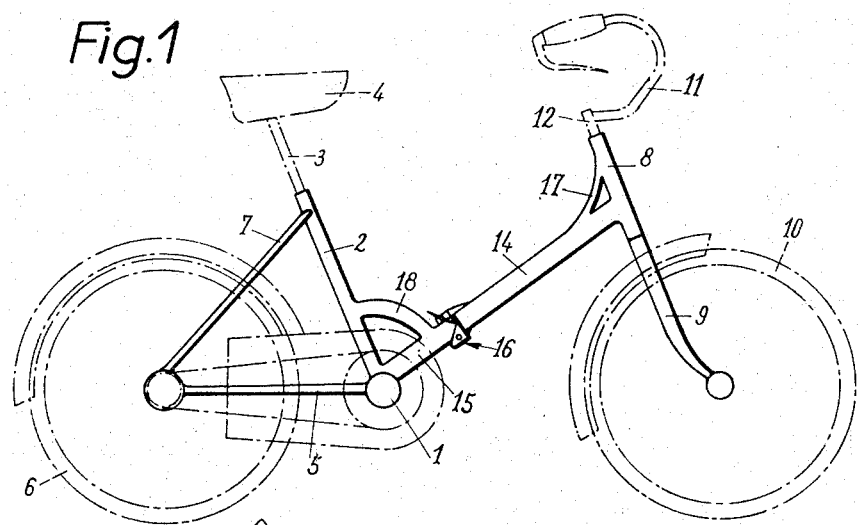
FIG. 1 is a diagrammatic view in elevation of the folding bicycle in running order.
Figure 2:
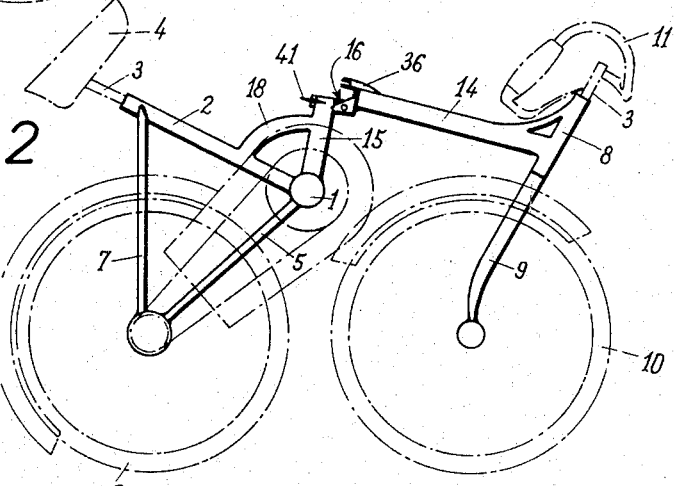
FIG. 2 is a view in elevation of the bicycle during folding.
Figure 3:
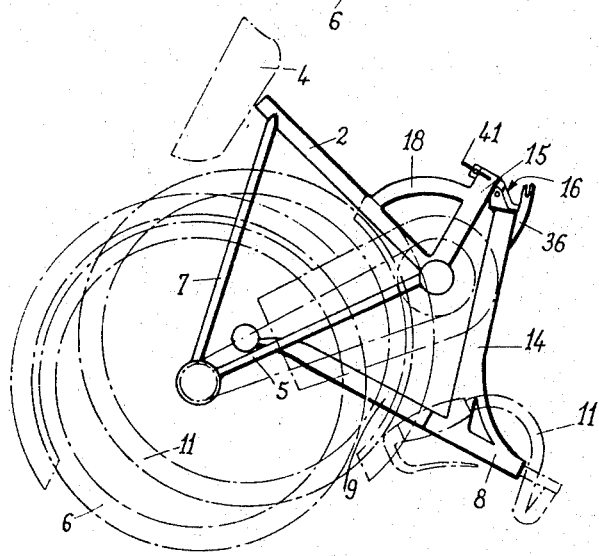
FIG. 3 is a view in elevation of the bicycle in the completely folded condition.

The improved folding bicycle which is generally illustrated in FIGS. 1 to 3 is essentially composed in a manner known per se of a frame comprising a crank-gear 1 from which extends a seat tube 2 and a seat pillar 3 slidably fitted in said tube for supporting the saddle 4. From the crank-gear 1 also extend the chain stays 5 in which the rear wheel 6 is mounted, the members 2 and 5 being braced by seat stays 7.

The front portion of the bicycle comprises a steering sleeve or so-called head tube 8, there being pivotally mounted in said head tube a fork 9 which carries the front wheel 10. The front fork 9 is controlled by the handlebar 11 which is coupled with the front fork by means of the fork head tube 12, the complete assembly being constructed in accordance with an arrangement which is common to most bicycles of known types.

The bicycle frame is completed by a tubular beam which joins the crank-gear 1 to the head tube 8, said beam being made up of two tube-sections 14 and 15 which are joined together by means of a hinged articulation 16.

The tube-section 14 which extends from the articulation 16 to the head tube 8 is strengthened at the point of junction with this latter by an arcuate cross-brace 17.

At the other end of the tubular beam, the tube-section 15 which extends from the hinged articulation 16 to the crank-gear 1 is strengthened by means of an arcuate cross-brace 18 which joins said tube-section 15 to the seat tube 2 and which additionally serves as a handle for carrying the folded bicycle by hand (as shown in FIG. 3).

Referring especially to FIGS. 4 to 9, it can be seen that the hinged articulation 16 consists of a yoke 20, the base 21 of which forms a bearing plate when the articulation 16 is closed, and which is welded at right angles to the end rim of the tube-section 14.

The legs 22 and 23 of the yoke are parallel and oriented at an oblique angle with respect to the base 21. Said legs 22 and 23 are traversed at right angles by a bolt 25 having a head 26 the plain stem 27 of which materializes the hinge line A—A. The hinge-line A—A makes an angle with the center line B—B of the tube-section 14 which differs from 90° by an angle $a$ which is equal, for example, to approximately 10°, although this value is given solely by way of indication.

In order to permit the coupling of the tube-section 15 to the tube-section 14, the articulation 16 additionally comprises a sleeve 30 formed, for example, of a steel tube which is either welded or brazed to the tube-section 15 close to the extremity of this latter. The sleeve 30 is set transversely and at an oblique angle with respect to the center-line C—C of said tube-section 15 said angle being the supplement of the angle $a$ referred-to above.

As shown in FIGS. 6 and 9, the sleeve 30 is either welded or brazed to the underside of the tube-section 15 as considered in the position in which the bicycle is ready for use.

For the purpose of assembly, the bolt 25 which forms the hinge-pin traverses the sleeve 30 with interposition of two self-lubricating rings 31 (as shown in FIG. 9) which are fitted with strong friction so as to form bearings for the plain stem 27 of the bolt 25. The rings 31 are additionally provided with annular flanges 32 which serve to center the sleeve 30 within the yoke 20 and which permit of slight friction against the inner faces of the legs 22 and 23.

In order to provide a permanent coupling between the different elements of the hinge, the end 45 of the bolt 25 is threaded and screwed into a tapped hole of the leg 23 which is provided for this purpose. The fastening is strengthened by means of a locking nut 28 which is screwed on the projecting end of the threaded portion 45 of the bolt, thus preventing any rotation of the bolt 25.

The end of the tube-section 15 is closed off by a plate 34 which is welded at right angles onto the annular end-face of the tube-section 15 and which forms a counter-bearing plate relative to the base 21 of the yoke 20 when the tube-sections 14 and 15 are disposed in alignment of each other (as shown in FIGS. 5 and 6).

When the bicycle is in running order and accordingly rests on its wheels, with the result that the hinge-pin 25 of the articulation 16 is placed beneath the tube-sections 14 and 15 which are in alignment so as to form the tubular beam, the weight of the cyclist who is mounted on the saddle 4 constantly tends to maintain the base 21 and the plate 34 applied against each other, and the tube-sections 14 and 15 consequently remain in alignment.

Nevertheless, in order to prevent any accidental opening of the articulation 16, for example in the event of sudden braking, provision is made for a safety locking system located above the tubular beam in the working position of the bicycle.

Said locking system consists in the first place of a vertical rib 36 which is edge-welded in the vicinity of the top generator-line of the tube-section 14. The end of the rib 36, which extends to a substantial distance beyond the bearing plate 21, is provided with a horizontal fork-end 37, the arms of which are bent back at their ends so as to form stops 38.

The other portion of the locking system consists of a vertical rib 39 which is also edge-welded in the vicinity of the top generator-line of the tube-section 15. The ribs 36, 39 are so disposed that, as and when the tube-sections 14 and 15 move into alignment, the projecting portion of the rib 36 accordingly moves into position along the rib 39 (as shown in FIG. 5).

The rib 39 is additionally fitted with a bolt 40 on which is screwed a wing-nut 41. The stem of the bolt 40 is adapted in the closed position to engage within the fork-end 37 and, after the wing-nut has been screwed up, the annular bearing-flange of said wing-nut is maintained in position by the stops 38 (as shown in FIG. 5).

The bicycle in accordance with the invention is folded as follows: the wing-nut 41 is unscrewed until it escapes from the stops 38. The tubular beam is lifted by the handle 18, whereupon the bicycle takes up the position shown in FIG. 2.

The relative rotation of the tube-sections 14 and 15 can continue through an angle of approximately 180° (as shown in FIG. 4) until the tube-section 15 abuts against the base 21 of the tube-section 14 (position 15a of FIG. 4). Taking into account the angle of inclination of the hinge-line or axis A—A relative to the axes B—B and C—C, when the tube-sections 14 and 15 have moved into the folded position, their axes make an angle with respect to each other which is equal to $2a$ (as shown in FIG. 8). This angle is sufficient to permit the wheels 6 and 10 and their components to take up the juxtaposed positions shown in FIG. 3, which represents the minimum size of the bicycle in the folded state.

In order to reduce the overall size of the bicycle still further, it is also possible as an optional feature to reverse the handle-bar 11, to insert the seat pillar 3 to the maximum extent within the seat tube and to turn back the nose of the saddle towards the rear wheel in accordance with the positions shown in FIG. 3.

The re-conversion of the bicycle to its working condition is effected by means of movements which are carried out in reverse sequence with equal ease. The folding bicycle in accordance with the invention provides a number of advantages over known systems, and among these advantages can be mentioned the following:

The hinged articulation is very rugged and, once closed, endows the tubular beam or front tube of the bicycle with high strength and rigidity.

As has been stated in the foregoing, the position of the hinge pin beneath the tubular beam guarantees the safety of the cyclist since his own weight tends to close the articulation and the bicycle could still run with safety even if the locking system were inadvertently left unscrewed.

The folding can be carried out very rapidly and calls for no disconnection of brake cables and lighting cables inasmuch as these latter follow the folding movement without suffering any wear.

The folded bicycle remains in one piece and can easily be carried by means of the handle 18. By virtue of its small overall size, it can be placed inside the trunk of an automobile.

It is apparent that the invention is not limited to the form of embodiment which has been described and that alternative forms can accordingly be contemplated.

The design of the hinge and hinge pin can be modified as well as that of the safety locking system which can be replaced in particular by a simple blade spring attached to one of the tube-sections and provided with a catch which engages with a lug provided on the other tube-section or which penetrates in a suitable slot.

I claim:

1. A folding bicycle comprising a single tubular beam carrying at its ends respectively a crank gear and a steering tube, said beam comprising two aligned tube sections and a hinged articulation joining said tube sections and permitting vertical swinging movement of said tube sections from a running position of said bicycle wherein said tube sections are in alignment to a folded position wherein they are at an angle to each other, the axis of said hinged articulation being disposed horizontally at an oblique angle with respect to the axis of said tubular beam and located beneath said beam when said tube sections are disposed in alignment and the bicycle is in running position.

2. A folding bicycle according to claim 1, and means to lock said tube sections to each other when said tube sections are in alignment, said locking means being located on the opposite side of said hinged articulation with respect to said beam and comprising two substantially radial ribs directly mounted one on each of said tube sections and adapted for mutual engagement when said bicycle is in running position, and tightening means for releasably securing said ribs to each other.

3. A folding bicycle according to claim 1, said hinged articulation comprising a yoke mounted on one end of one of said tube sections, a sleeve mounted on the adjacent end of the other tube section, said sleeve being engaged within said yoke, a hinge pin detachably engaged through said yoke and sleeve, and self-lubricating rings housed in said sleeve and receiving said hinge pin.

4. A folding bicycle according to claim 1, said hinged articulation comprising a yoke mounted on one end of one of said tube sections, a sleeve mounted on the adjacent end of the other tube section, said sleeve being engaged within said yoke, a hinge pin detachably engaged through said yoke and sleeve, a bearing plate mounted on said yoke at right angles to the axis of said tube section bearing said yoke, a counterbearing plate mounted on the adjacent end of the other tube section at right angles to the axis thereof, said plates being in mutual bearing contact when said tube sections are disposed in alignment.

References Cited

UNITED STATES PATENTS

| 2,594,034 | 4/1952 | King | 180—33 |
| 3,195,923 | 7/1965 | Moulton | 280—287 X |
| 3,294,416 | 12/1966 | Carnielli | 287—99 X |

FOREIGN PATENTS

| 968,490 | 4/1950 | France. |
| 1,106,626 | 5/1961 | Germany. |
| 1,014,579 | 12/1965 | Great Britain. |

KENNETH H. BETTS, *Primary Examiner.*